(12) United States Patent
Desai et al.

(10) Patent No.: US 11,641,514 B1
(45) Date of Patent: May 2, 2023

(54) USER STATE FOR USER IMAGE IN MEDIA CONTENT

(71) Applicant: Motorola Mobility LLC, Chicago, IL (US)

(72) Inventors: Rahul B. Desai, Hoffman Estates, IL (US); Amit Kumar Agrawal, Bangalore (IN); Mauricio Dias Moises, Campinas (BR)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/529,542

(22) Filed: Nov. 18, 2021

(51) Int. Cl.
*H04N 21/854* (2011.01)
*H04N 21/472* (2011.01)

(52) U.S. Cl.
CPC ..... *H04N 21/854* (2013.01); *H04N 21/47205* (2013.01)

(58) Field of Classification Search
CPC .............. H04N 21/854; H04N 21/47205
USPC ........................................................ 386/278
See application file for complete search history.

(56) References Cited

U.S. PATENT DOCUMENTS

| | | | | |
|---|---|---|---|---|
| 8,373,799 B2* | 2/2013 | Reponen | ................ | G10L 15/26 348/460 |
| 9,591,181 B2* | 3/2017 | Cunningham | ........ | G06F 3/0485 |
| 10,165,176 B2* | 12/2018 | Frahm | ................ | H04N 5/23219 |
| 10,950,275 B2* | 3/2021 | Taine | ................ | H04N 7/155 |
| 11,483,276 B2* | 10/2022 | Adamski | ................ | H04L 51/10 |
| 11,509,942 B2* | 11/2022 | Evans | ............. | H04N 21/44213 |
| 11,601,721 * | 3/2023 | Bloch | ................ | H04N 21/812 |
| 2015/0213316 A1* | 7/2015 | Vunic | .................... | G06V 20/40 386/278 |
| 2016/0191958 A1* | 6/2016 | Nauseef | ................ | G06V 40/20 725/116 |
| 2020/0393908 A1* | 12/2020 | Kejariwal | ............ | G06V 40/167 |
| 2021/0051033 A1* | 2/2021 | Backer | ............... | H04N 21/4788 |

* cited by examiner

*Primary Examiner* — Helen Shibru
(74) *Attorney, Agent, or Firm* — FIG. 1 Patents

(57) ABSTRACT

Techniques for user state for user image in media content are described and are implementable to enable a user state of a user to be determined and to control whether a user image is included in media content based on the user state. Generally, the described implementations enable different user states to be defined and utilized to control inclusion of user images with media content.

20 Claims, 10 Drawing Sheets

USER STATE FOR USER IMAGE IN MEDIA CONTENT

BACKGROUND

Today's modern devices provide users with a variety of different opportunities for capturing multimedia content. For instance, a typical smart device (e.g., a smartphone) includes image capture capability for capturing still images and video, as well as audio capture capability. In addition to enabling users to capture content for their own consumption, these capabilities enable users to generate media content for consumption by other persons. For instance, a variety of different online services are available for publishing user-generated media content for general consumption.

BRIEF DESCRIPTION OF THE DRAWINGS

Aspects of user state for user image in media content are described with reference to the following Figures. The same numbers may be used throughout to reference similar features and components that are shown in the Figures.

DETAILED DESCRIPTION

Figure 1:
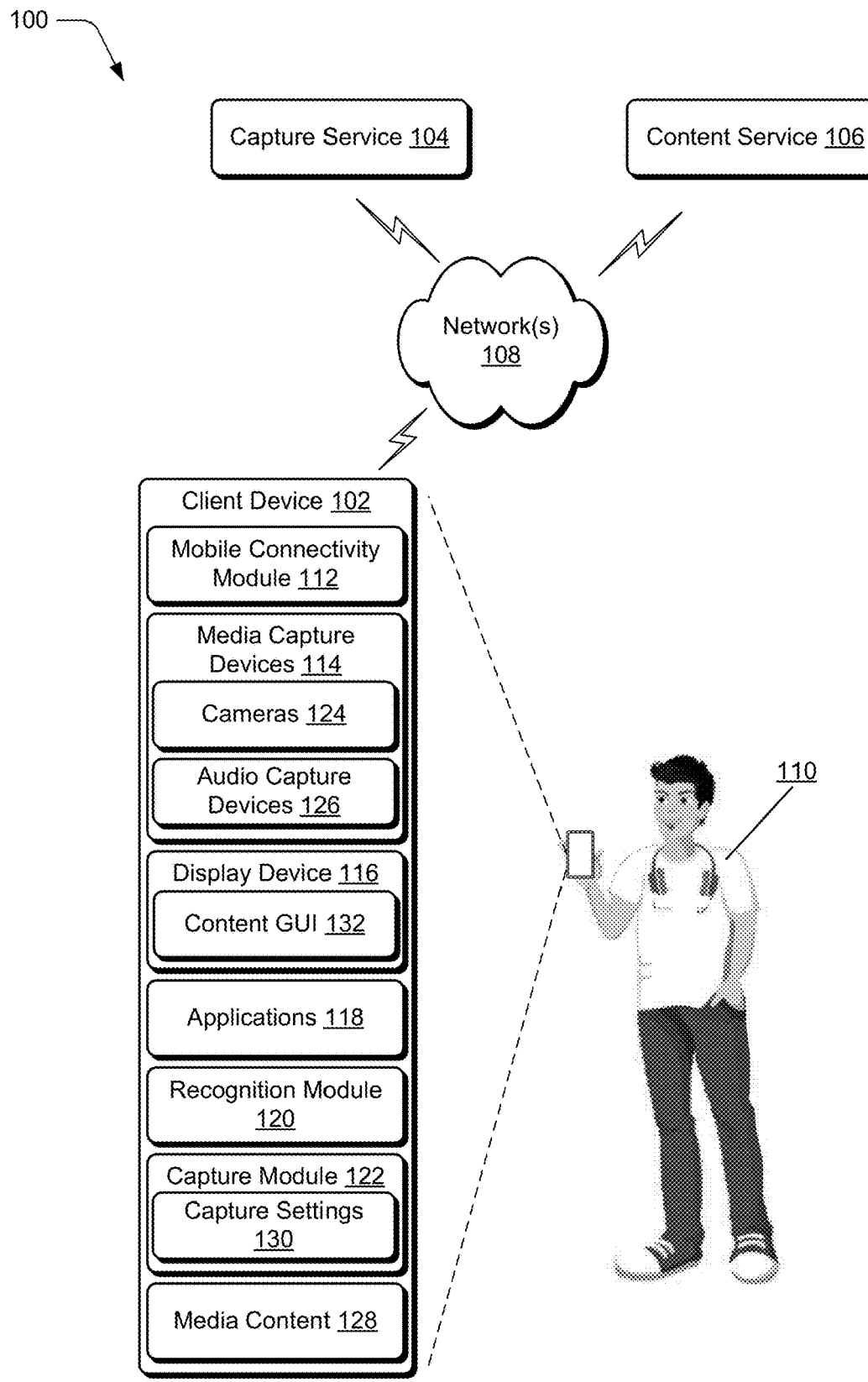
FIG. 1 illustrates an example environment in which aspects of user state for user image in media content can be implemented.

Techniques for user state for user image in media content are described and are implementable to enable a user state of a user to be determined and to control whether a user image is included in media content based on the user state. Generally, the described implementations enable different user states to be defined and utilized to control inclusion of user images with media content.

According to various implementations, a user leverages a client device to capture media content. For instance, a client device (e.g., a smartphone) is in a content capture mode for generating the media content. In at least one implementation the content capture mode represents a video blogging mode for generating a video blog. Further, the client device includes multiple cameras for capturing visual scenes and objects from various perspectives of the client device. For instance, the client device includes a first camera that captures a visual scene from a first perspective (e.g., a rear facing camera) and a second camera that captures an image of a user, e.g., a front facing camera. Thus, a first video feed from the first camera and a second video feed from the second camera are available to generate an instance of video content. Alternatively or additionally, the first video feed represents application content generated by an application, such as an application executed and/or exposed via the client device.

Further to example implementations, to determine whether to include an image of a user in media content, a user state of the user is determined. For instance, various sensors are utilized to capture visual attributes of the user, such as physical features including facial features. Based on visual attributes of the user, for example, different facial gestures are identifiable to indicate different user states of the user. Generally, different user states are definable such as an engaged state (e.g., the user is talking), a disengaged state (e.g., the user is not talking), a body state (e.g., the user is sneezing or coughing), a consume state (e.g., the user is consuming a substance such as food and/or drink), etc.

In at least one implementation, when a user is determined to be in a disengaged state, media content is generated that includes a captured image of visual scene but does not include an image of the user. For instance, when a user is in a disengaged state, this indicates that the user is passive and thus the media content is focused on a visual scene such as scenery and/or live action occurring in a surrounding environment. When a user begins talking the user is detected to be in an engaged state and thus media content can be generated to include an image of the user. The image of the user, for example, is included along with the visual scene in the media content. Generally, this enables the image of the user to be presented when the user is providing comments regarding the visual scene and/or other speech content.

In at least one implementation some user states represent states in which inclusion of a user image in media content is to be at least temporarily paused. For example, consider a scenario in which a user is in an engaged state and a user image is being included in media content. The user is then detected in a body state, such as sneezing or about the sneeze, or coughing or about to cough. Alternatively or additionally, the user is detected in a consume state, such as drinking or eating. Accordingly, inclusion of the user image in media content can be paused to avoid showing the user sneezing or coughing, or eating or drinking, in the media content. When the user transitions from the body state and/or the consume state (e.g., returns to an engaged state), inclusion of the user image in media content can be resumed.

In at least one implementation media capture settings are configurable to specify user states in which a user image is to be included in media content and user states in which a user image is not to be included in media content. Generally, this provides for customizable media content generation tailored to specific user scenarios.

Accordingly, the techniques described herein provide for automated detection of user states and for automated switching between inclusion of a user image in media content and exclusion of a user image in media content. These capabilities remove the need for a user to manually specify whether a user image is included in media content while the media content is being generated.

While features and concepts of user state for user image in media content can be implemented in any number of environments and/or configurations, aspects of user state for user image in media content are described in the context of the following example systems, devices, and methods.

FIG. 1 illustrates an example environment 100 in which aspects of user state for user image in media content can be implemented. The environment 100 includes a client device 102, a capture service 104, and a content service 106 that are interconnectable via network(s) 108. In this particular example, the client device 102 represents a portable device that can be carried by a user 110, such as a smartphone or a tablet device. These examples are not to be construed as limiting, however, and the client device 102 can be implemented in a variety of different ways and form factors such as a laptop computer, a desktop computer, and so forth. Example attributes of the client device 102 are discussed below with reference to the device 900 of FIG. 9.

The client device 102 includes various functionality that enables the client device 102 to perform different aspects of user state for user image in media content discussed herein, including a mobile connectivity module 112, media capture devices 114, a display device 116, applications 118, a recognition module 120, and a content capture module ("capture module") 122. The mobile connectivity module 112 represents functionality (e.g., logic and hardware) for enabling the client device 102 to interconnect with other devices and/or networks, such as the network 108. The mobile connectivity module 112, for instance, enables wireless and/or wired connectivity of the client device 102.

The media capture devices 114 are representative of functionality to enable various types of media to be captured via the client device 102, such as visual media and audio media. In this particular example the media capture devices 114 include cameras 124 and audio capture devices 126. The media capture devices 114, however, can include a variety of other devices that are able to capture various types of media in accordance with the implementations discussed herein. Generally, the media capture devices 114 include not only hardware for capturing associated media but also logic (e.g., drivers, firmware, etc.) for operating and configuring operation of the associated media capture devices 114. The display device 116 represents functionality (e.g., hardware and logic) for enabling visual output via the client device 102. The applications 118 represent functionality for enabling different tasks to be performed via the client device 102, such as productivity tasks, entertainment tasks (e.g., gaming, media content consumption), web browsing, etc.

The recognition module 120 represents functionality for recognizing visual objects such as in visual content (e.g., digital video) captured by the cameras 124. In at least one implementation the recognition module 120 is operable to recognize human features such as facial features and other bodily features. Further, the recognition module 120 is operable to recognize human gestures such as facial gestures, hand gestures, finger gestures, and other human gestures. In at least one implementation the recognition module 120 includes and/or makes use of artificial intelligence (AI) algorithms to enable recognition of various human attributes such as human features and human gestures. While the recognition module 120 is depicted separately from the capture module 122, in at least one implementation the recognition module 120 represents functionality implemented by the capture module 122.

The capture module 122 represents functionality for performing various aspects of user state for user image in media content described herein. The capture module 122, for instance, enables content captured by the media capture devices 114 to be utilized to generate media content 128. Further, the capture module 122 enables the media content 128 to be generated based on capture settings 130 that specify how the media content 128 is to be generated. For instance, and as further detailed below, the capture module 122 leverages the capture settings 130 to determine in which scenarios an image of the user 110 is to be included in media content 128 and in which scenarios the image of the user 110 is not to be included. Further, the capture module 112 is operable to leverage the capture settings 130 to cause various human gestures recognized by the recognition module 120 in video content captured by the cameras 124 to be excluded from or included in instances of the media content 128. The client device 102 also includes a content graphical user interface (GUI) 132 that is displayable by the display device 116 for displaying visual content captured by the cameras 124 as well as instances of the media content 128.

Further to the environment 100, the capture service 104 represents a network-based service that is accessible to the client device 102 (e.g., via the network 108) for assisting in content capture and/or generation tasks. For example, the recognition module 120 leverages the capture service 104 to assist in performing visual object recognition tasks, such as for recognizing different user gestures. In at least one implementation the capture service 104 provides AI services to the recognition module 120 for enabling different object recognition tasks. The content service 106 represents a network-based service to which instances of the media content 128 are publishable such as to enable other users to access and consume instances of the media content 128.

Having discussed an example environment in which the disclosed techniques can be performed, consider now some example scenarios and implementation details for implementing the disclosed techniques.

FIGS. 2a-6 depict example aspects of user state for user image in media content in accordance with one or more implementations. While the aspects are described in the context of various functionality of the client device 102, it is to be appreciated that the aspects are implementable in a variety of different device scenarios not expressly described herein. Further, certain features of the client device 102 are omitted for purpose of discussion but are considered to be available for implementing the described aspects.

Figure 2A:
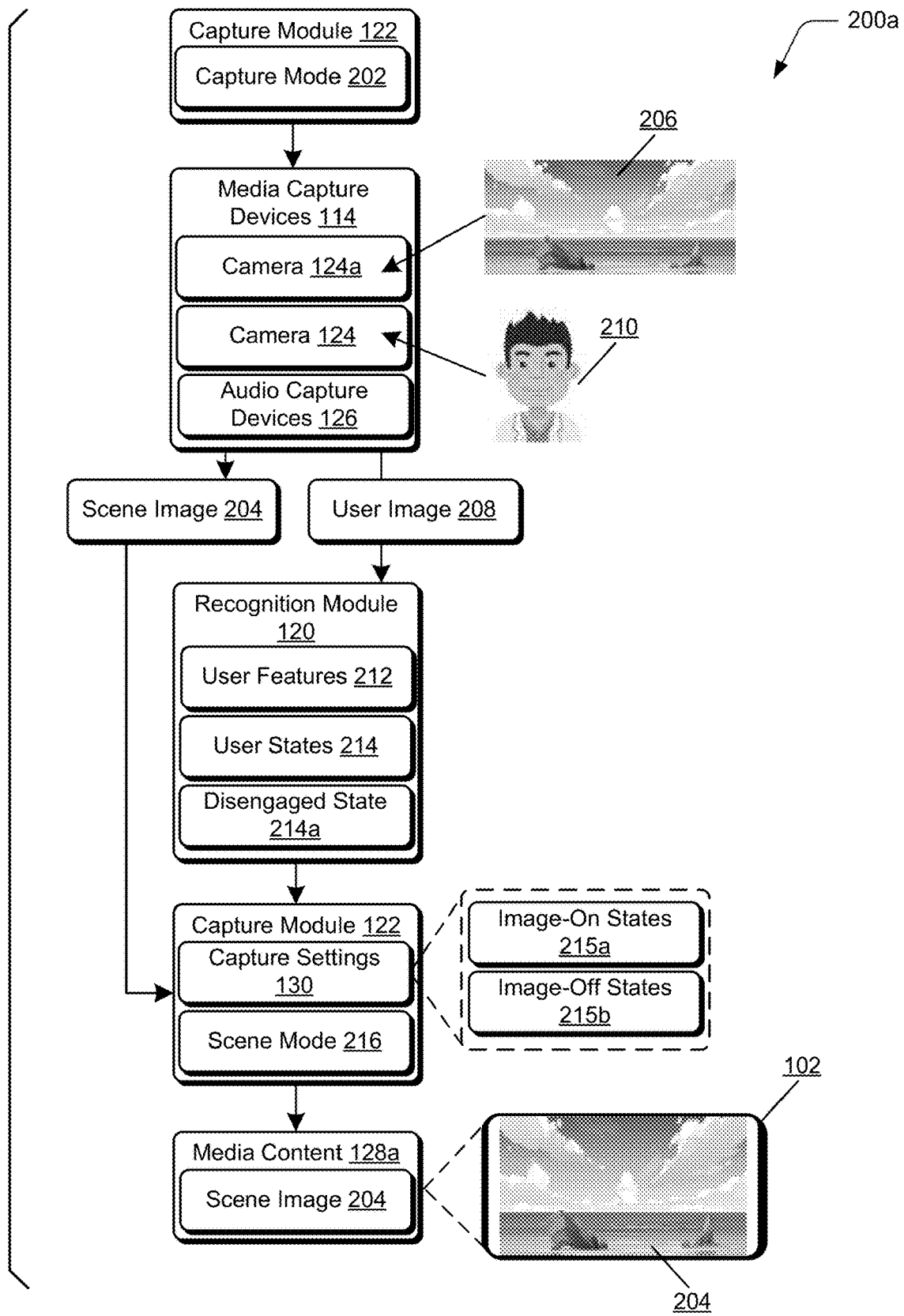
FIG. 2a depicts an example system for initiating a capture mode for generating media content in accordance with one or more implementations.

FIG. 2a depicts an example system 200a for initiating a capture mode for generating media content in accordance with one or more implementations. Generally, the system 200a can be implemented in the environment 100 and incorporates attributes of the environment 100 introduced above.

In the system 200a a capture mode 202 of the capture module 122 is activated. Generally, the capture mode 202 represents a mode in which the capture module 122 generates media content 128, such as for storage and subsequent consumption and/or for real-time consumption, e.g., a livestream. The capture mode 202, for instance, is activated based on user input to activate the capture mode 202, e.g., input to the client device 102. In at least one implementation the capture mode 202 represents a video blogging mode and the media content 128 includes instances of video blogs generated while in the video blogging mode.

In conjunction with activation of the capture mode 202 a camera 124a captures a scene image 204 of scene 206 and a camera 124b captures a user image 208 of a user 210. Generally, the cameras 124a, 124b represent different instances of the cameras 124. In at least one implementation the cameras 124a, 124b are positioned at different respective positions relative to the client device 102. For instance, the camera 124a represents a rear-facing camera of the client device 102 and the camera 124b represents a front-facing camera of the client device 102. Accordingly, in this example, the scene 206 represents visual objects (e.g., scenery) in view of the camera 124a and the user 210 is in view of the camera 124b. In at least one implementation the camera 124b is operable in a low power mode where the user image 208 is captured but is not displayed on the display device 116.

Further to the system 200a the recognition module 120 processes the user image 208 to identify user features 212 of the user 210 indicated by the user image 208. The user features 212, for instance, represent physical features of the user 210 such as facial features including facial gestures as well as other physical features such as user pose, bodily gestures (e.g., hand gestures), and so forth. The recognition module 120 compares the user features 212 to user states 214 to determine that the user 210 is in a disengaged state 214a. Generally, the user states 214 include different predefined states that are usable by the capture module 122 to determine how to configure and/or present content for the media content 128. The user states 214, for instance, include state mappings that specify human gestures (e.g., facial gestures) that correlate to different user states. Different examples of the user states 214 are detailed below.

In this particular example the user features 212 indicate that the user 210 is in a disengaged state 214a, which represents an instance of the user states 214. The user features 212, for instance, indicate that the user 210 is in a passive state (e.g., not talking) and is thus in the disengaged state 214a. Accordingly, the capture module 122 determines based on the capture settings 130 whether the user image 208 is to be included in media content. The capture settings 130, for example, identify different image-on states 215a and image-off states 215b. Generally, the image-on states 215a specify different user states 214 in which a user image is to be included in media content, and the image-off states 215b specify different user states 214 in which a user image is not to be included in media content. In this particular example the disengaged state 214a is identified as an image-off state 215b.

Accordingly, since the user 210 is determined to be in the disengaged state 214a which represents an image-off state 215b, the capture module 122 determines that an instance of media content 128a is to be generated based on a scene mode 216 to include the scene image 204. The capture settings 130, for instance, map different user states 214 to different content modes that specify content type(s) to be included in media content and/or how content is to be visually arranged in media content. For example, at this particular point during generation of the media content 128a and based on the scene mode 216, the media content 128a includes the scene image 204 and does not include the user image 208. For instance, since the user 210 is determined to be in the disengaged state 214a (e.g., an image-off state 215b), the user image 208 is not included in the media content 128a.

Figure 2B:
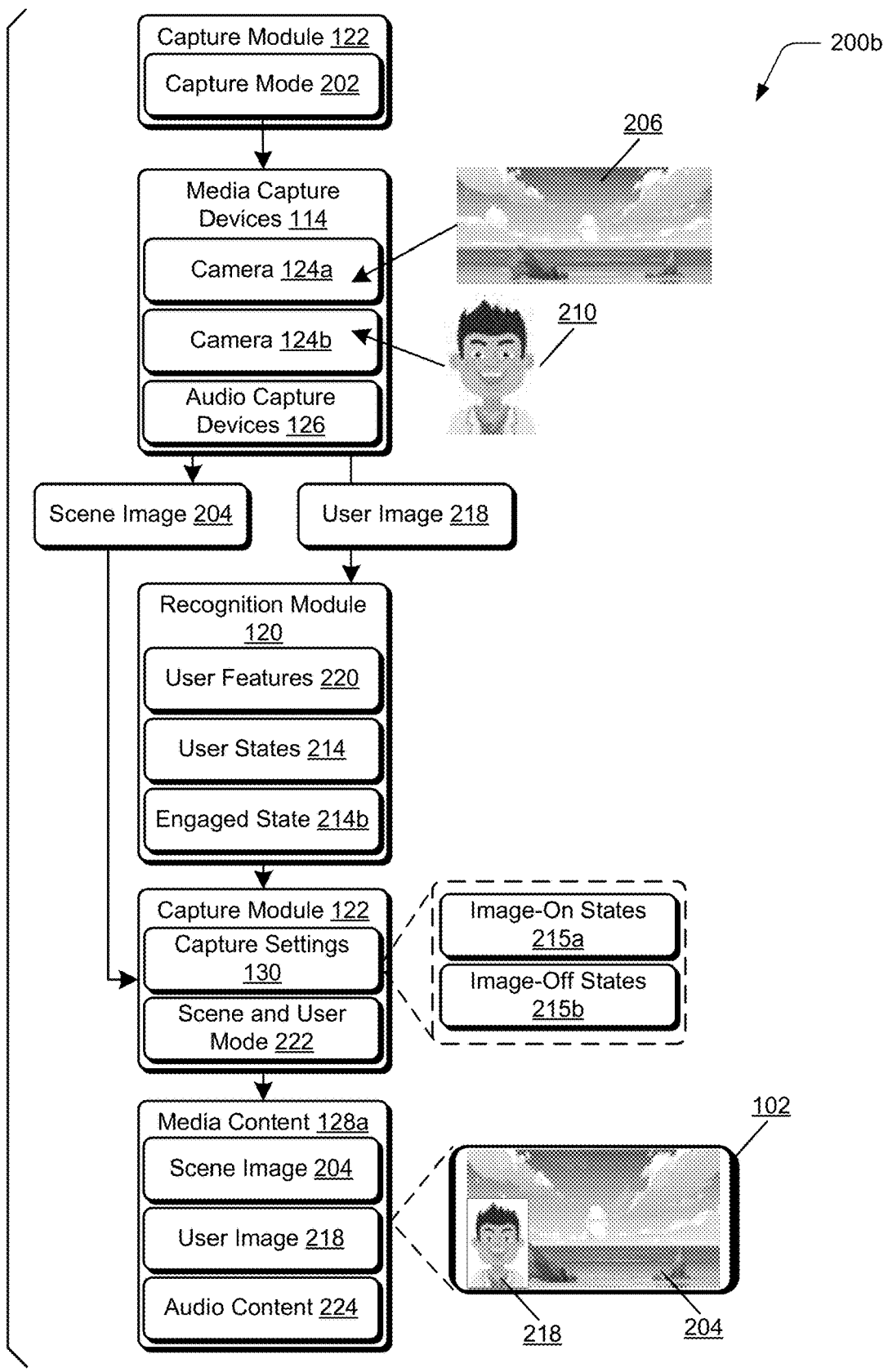
FIG. 2b depicts a system for generating media content based on a change in user state in accordance with one or more implementations.

FIG. 2b depicts a system 200b for generating media content based on a change in user state in accordance with one or more implementations. The system 200b, for instance, represents a continuation of the system 200a. In the system 200b the cameras 124a, 124b continue to capture images of the scene 206 and the user 210. For instance, a user image 218 of the user 210 is captured and the recognition module 120 processes the user image 218 to identify user features 220 from the user image 218. Further, the recognition module 120 compares the user features 220 to the user states 214 to determine that the user 210 is in an engaged state 214b. For instance, the user features 220 indicate that the user 210 is about to start talking and/or is currently talking, such as based on facial features, e.g., an open and/or moving mouth. Further, the capture settings 130 specify that the engaged state 214b is an image-on state 215a.

Accordingly, since the user 210 is determined to be in the engaged state 214b which represents an image-on state 215a, the capture module 122 determines that the instance of media content 128a is to be generated based on a scene and user mode 222 to include the scene image 204 and the user image 218. For instance, as part of continuing generation of the media content 128a, the user image 218 is included along with the scene image 204 as part of the media content 128a. The user image 218, for example, is superimposed as a live image of the user 210 over a portion of the scene image 204, e.g., as a picture-in-picture (PIP) display within the scene image 204. Accordingly, while the user 210 is detected as being in the engaged state 214b the media content 128a is generated based on the scene and user mode 222. Further, the media content 128a is generated to include audio content 224 captured by the audio capture devices 126. The audio content 224, for instance, includes speech content captured by the audio capture devices 126 from the user 210.

In at least one implementation if the user stops talking (e.g., for a threshold period of time) the capture module 122 detects a change to the disengaged state 214a and switches to the scene mode 216 where the scene image 204 is used to generate the media content 128a and the user image 218 is removed from display, such as described in the system 200a. Accordingly, the described techniques are implementable to dynamically detect changes in user state (e.g., engagement state) and to automatically and dynamically switch content generation modes based on the user state changes.

Figure 3:
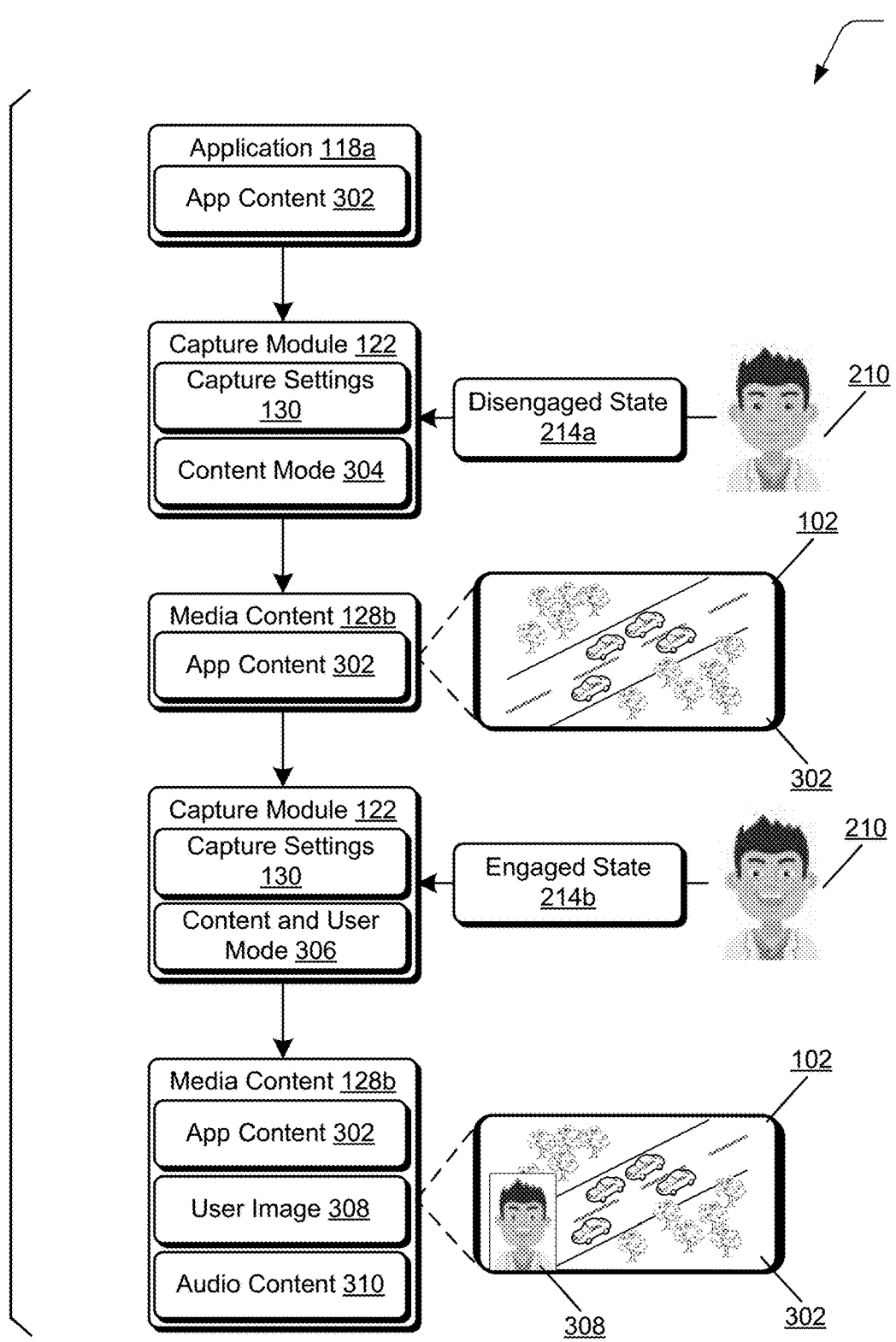
FIG. 3 depicts a system for generating media content utilizing application content in accordance with one or more implementations.

FIG. 3 depicts a system 300 for generating media content utilizing application content in accordance with one or more implementations. In the system 300 the capture module 122 is in the capture mode 202 (such as described above) and is generating an instance of media content 128b using application ("app") content 302 generated by an application 118a. The application 118a, for instance, represents an instance of the applications 118 executing and/or exposed via the client device 102. In at least one implementation the application 118a represents a gaming application and the app content 302 represents gaming content, e.g., a video game. The user 210, for example, is engaged in gameplay of the application 118a. Further, the user 210 is determined to be in the disengaged state 214a which in this particular example represents an image-off state 215b. Example ways for determining different user states (e.g., engaged, disengaged, etc.) are detailed above such as with reference to the systems 200a, 200b.

Accordingly, based on determining that the user 210 is in the disengaged state 214a, the capture module 122 determines based on the capture settings 130 that the instance of media content 128b is to be generated based on a content mode 304 to include the app content 302. For instance, at this particular point during generation of the media content 128b and based on the content mode 304, the media content 128b includes the app content 302 and does not include the user image 218, e.g., since the user 210 is determined to be in the disengaged state 214a.

Further to the system 300 the capture module 122 detects a change in user state of the user 210 from the disengaged state 214a to the engaged state 214b, which in this particular example is identified as an image-on state 215a. Ways for detecting a change in user state are described throughout, such as based on detecting a change in facial gestures of the user 210. Accordingly, based on detecting the engaged state 214b of the user 210, the capture module 122 determines based on the capture settings 130 that the instance of media content 128b is to be generated based on a content and user mode 306 to include the app content 302 and a user image 308. For instance, as part of continuing generation of the media content 128b, the user image 308 is included along with the app content 302 as part of the media content 128b. Further, the media content 128b is generated to include audio content 310 captured by the audio capture devices 126. In at least one implementation this enables the user image 308 of the user 210 to be presented and enables the user 210 to provide commentary regarding the app content 302. For instance, in a gaming scenario, the audio content 310 includes commentary on gameplay of the application 118a.

Generally, in the context of the client device 102, using the app content 302 as part of generating the media content 128b enables multiple cameras 124 to be available for capturing visual content, such as the user image 308. For instance, in conjunction with capturing the app content 302 from the application 118a, the user image 308 can be captured by the camera 124a (e.g., a rear-facing camera of the client device 102) and/or the camera 124b, e.g., a front-facing camera of the client device 102. Other types of visual content additionally or alternatively to the user image 308 may be captured via the cameras 124 for inclusion as part of the media content 128b, such as other visual objects and/or visual scenes in proximity to the client device 102.

Further, the app content 302 may represent content displayed on the display device 116 of the client device 102 and/or content displayed on an external display device that is connected to the client device 102. For instance, the client device 102 can connect to a remote display device (e.g., via wireless and/or wired connectivity) and provide the app content 302 for display on the remote display device. Thus, the app content 302 can be presented in a variety of different ways in conjunction with generating the media content 128b, such as locally on the client device 102 and/or remotely on a connected external display device.

While the system 300 is discussed in the context of gaming content, a variety of other examples of app content 302 are contemplated, such as productivity content, social media content, web browsing content, etc. Generally, the system 300 is implementable to dynamically respond to changes in user state. For instance, where the user 210 is detected as returning to the disengaged state 214a, the capture module 122 switches to generating the media content 128b based on the content mode 304.

Figure 4:
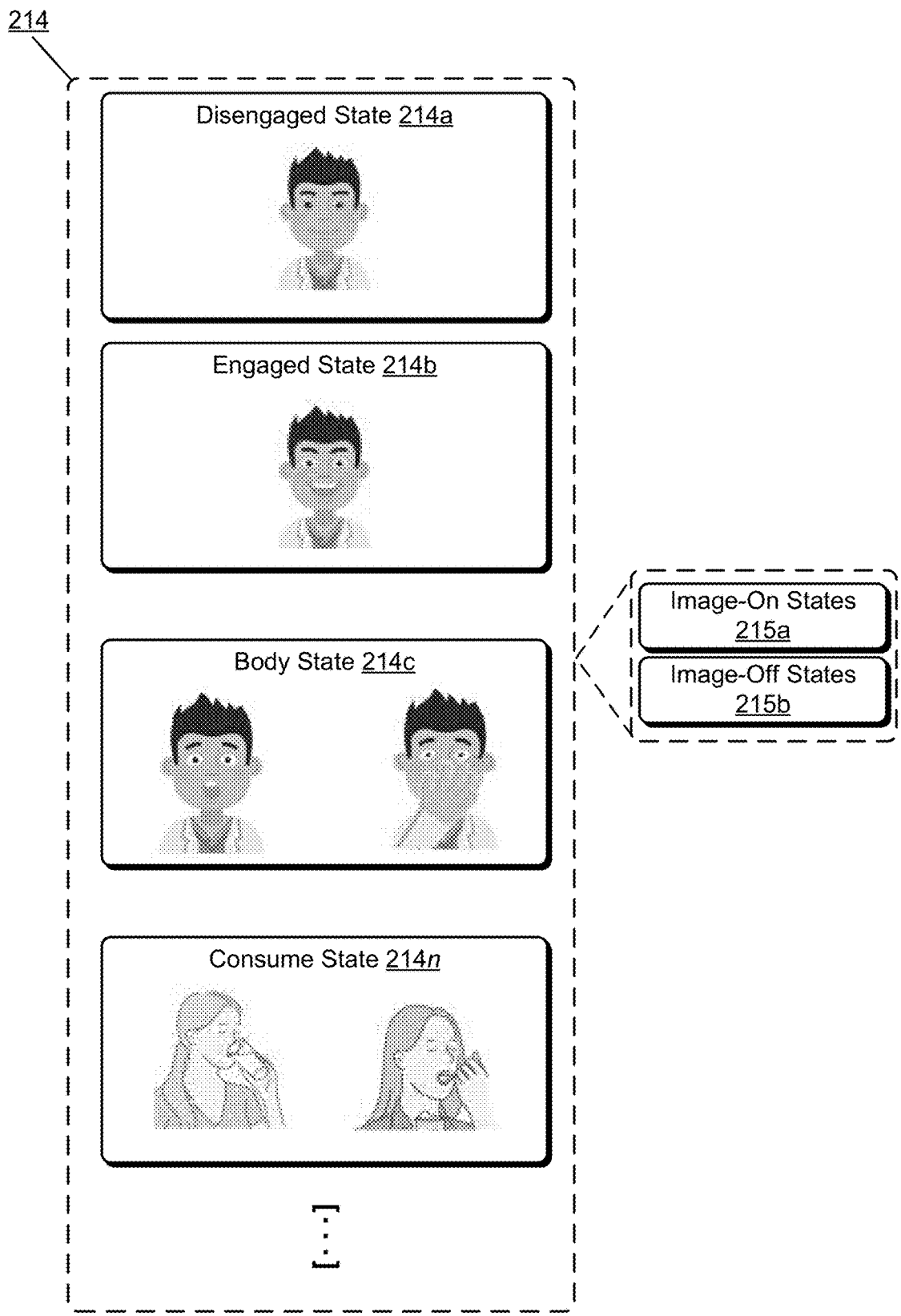
FIG. 4 depicts different examples of user states that are utilizable to control how media content is generated in accordance with one or more implementations.

FIG. 4 depicts different examples of user states 214 that are utilizable to control how media content is generated in accordance with one or more implementations. Generally, the user states 214 are detectable based on detecting various human features of a user, such as facial gestures, hand gestures, bodily gestures, and so forth. In a facial gesture scenario, for instance, the recognition module 120 detects various facial features and positions of the facial features to determine a user state 214. Examples of different facial features/positions include eyebrow position (e.g., normal, lowered, raised), eyelid position (e.g., open, open wide, lowered, closed), lip orientation (e.g., closed, open, open wide, in motion, smiling, frowning), etc. In at least one implementation detecting the user states 214 includes detecting visual objects in proximity to a user, which are usable to determine current and/or prospective activities of a user.

The user states 214 include the disengaged state 214a and the engaged state 214b, introduced above. The user states 214 also include a body state 214c and a consume state 214n. The body state 214c corresponds to different bodily functions of a user, such as sneezing and coughing. For instance, certain body states 214c are detectable based on corresponding facial and/or hand gestures. For instance, when a user is about to sneeze or cough the user may inhale deeply, raise their eyebrows, open their mouth wide, cover their mouth with their hand or their elbow, etc.

The consume state 214n corresponds to an indication that a user is about to consume a substance (e.g., food, drink, etc.) or is currently consuming a substance. Generally, detecting the consume state 214n can include detecting a user handling an eating utensil, handling a liquid vessel (e.g., a glass, a drink container, etc.), detecting a consumable substance in proximity to the user, etc.

According to various implementations the different user states 214 can be utilized to control how media content is generated. For instance, as described in the previous examples, different user states 214 are categorized as either image-on states 215a or image-off states 215b. Accordingly, whether a user image is included in media content is controllable based on whether the user is in an image-on state 215a or an image-off state 215b. In at least one example the body state 214c and the consume state 214n are identified as image-off states 215b such that inclusion of a user image with media content is paused or stopped in response to detecting a body state 214c or a consume state 214n.

For instance, consider a scenario in which a user is in an engaged state 214b which represents an image-on states 215a. Accordingly, the user's image is included in media content being generated. The recognition module 120 then detects a transition to a body state 214c or a consume state 214n, which are indicated in this example as image-off states 215b. In response the capture module 122 is operable to pause or stop inclusion of the user image in the media content, e.g., to avoid including a particular bodily function in the media content, and/or to avoid showing the user consuming a particular substance in the media content.

How media content capture is controlled based on different user states 214, however, is configurable. For instance, default settings of the capture module 122 specify that when a disengaged state 214a, a body state 214c, and/or a consume state 214n are detected, inclusion of a user image in media content is to be paused or stopped. Settings of the capture module 122, however, are able to be configured to change these settings such as to enable a user to specify in which user states a user image is to be included with media content. Consider, for example, the following implementation.

Figure 5:
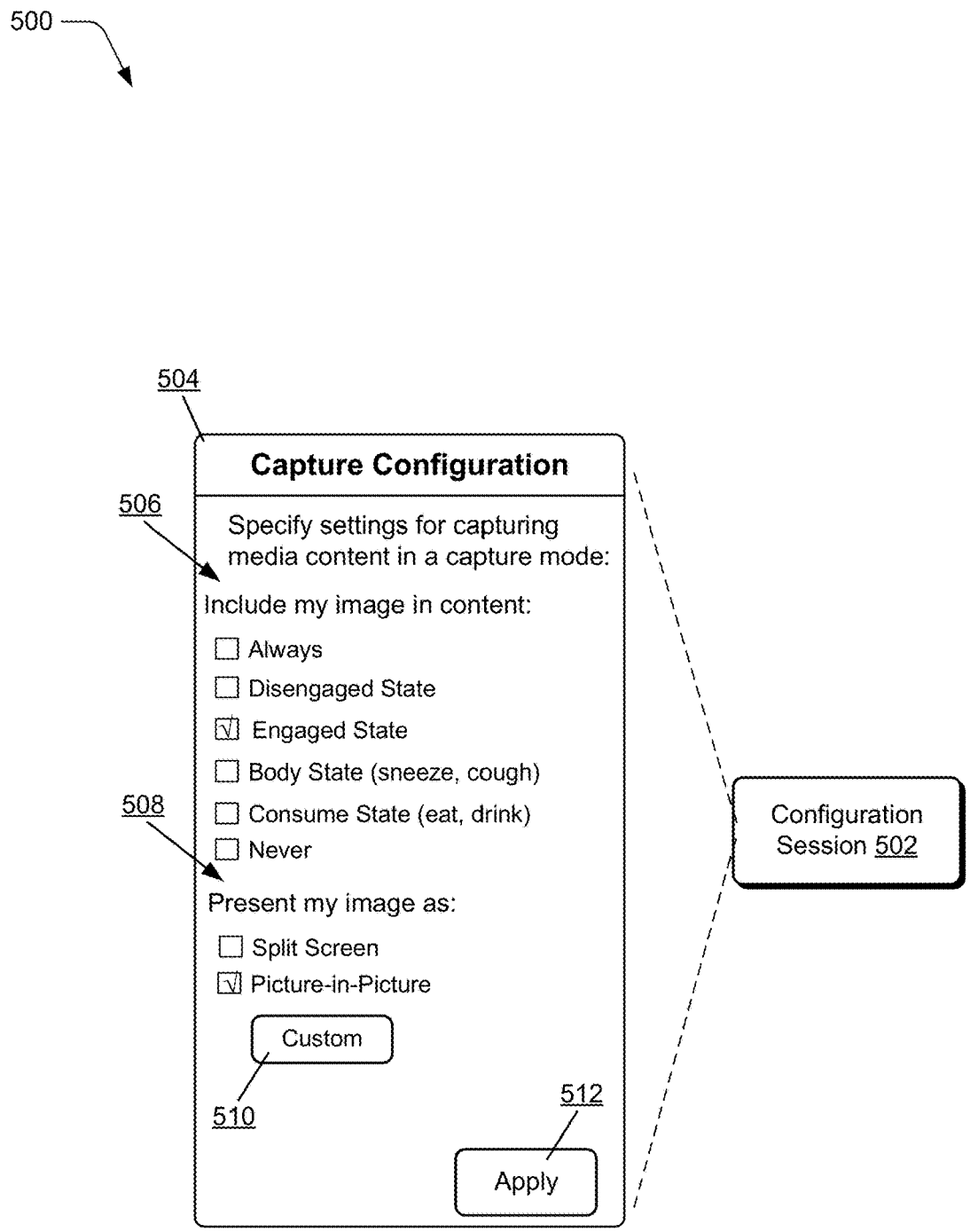
FIG. 5 depicts a scenario to configuring capture settings of a capture module in accordance with one or more implementations.

FIG. 5 depicts a scenario 500 to configuring capture settings 130 of the capture module 122. In the scenario 500 a configuration session 502 is implemented to enable the capture settings 130 to be configured. A user, for instance, interacts with the client device 102 to cause the configuration session 502 to be invoked. As part of the configuration session 502 the capture module 122 causes a configuration graphical user interface (GUI) 504 to be presented, such as on the display device 116 of the client device 102. The configuration GUI 504 includes a state field 506 and an image configuration field 508. The state field 506 includes different selectable options for specifying when a user's image is to be included in media content. An "Always" option is selectable to cause the user's image to always be included in media content, e.g., when the capture mode 202 is active. A "Disengaged State" option is selectable to cause a user's image to be included in media content when the user is detected in a disengaged user state. In at least one example a default capture setting 130 specifies that the "Disengaged State" option is deselected such that by default a user's image is not included in media content when the user is detected in a disengaged state. A user, however, can select the "Disengaged State" option to override this default setting such that the user's image is included in media content when the user is detected in a disengaged state.

An "Engaged State" option is selectable to cause a user's image to be included in media content when the user is detected in an engaged state. In at least one example a default capture setting 130 specifies that the "Engaged State" option is selected such that by default a user's image is included in media content when the user is detected in an engaged state. A user, however, can deselect the "Engaged State" option to override this default setting such that the user's image is not included in media content when the user is detected in an engaged state.

A "Body State" option is selectable to cause a user's image to be included in media content when the user is detected as performing or about the perform a bodily function, such as sneezing or coughing. In at least one example a default capture setting 130 specifies that the "Body State" option is deselected such that by default a user's image is not included in media content when the user is detected in a body state. A user, however, can select the "Body State" option to override this default setting such that the user's image is included in media content when the user is detected in a body state.

A "Consume State" option is selectable to cause a user's image to be included in media content when the user is detected as being in a consume state, such as consuming or about to consume a substance, e.g., eating and/or drinking. In at least one example a default capture setting 130 specifies that the "Consume State" option is deselected such that by default a user's image is not included in media content when the user is detected in consume state. A user, however, can select the "Consume State" option to override this default setting such that the user's image is included in media content when the user is detected in a consume state. A "Never" option is selectable to cause the user's image to never be included in media content, e.g., when the capture mode 202 is active.

The image configuration field 508 includes different selectable image configuration options for specifying how a user's image is to be positioned in media content. A "Split Screen" option is selectable to cause a user's image to be presented in a split screen orientation. For instance, the user's image is presented on one half of a display region and captured scene content is presented on the other half. The "Picture-in-Picture" option is selectable to cause a user's image to be positioned in a PIP configuration, e.g., as a small image superimposed over a larger image of a captured scene.

The configuration GUI 504 also includes a custom control 510 and an apply control 512. The custom control 510 enables a user to specify a custom visual configuration for presenting an image of the user in media content. For instance, as described in the following figure, a user is able to specify a custom position and size for an image of the user in media content. The apply control 512 is selectable to apply the various settings from the configuration GUI 504 to the capture settings 130.

Figure 6:
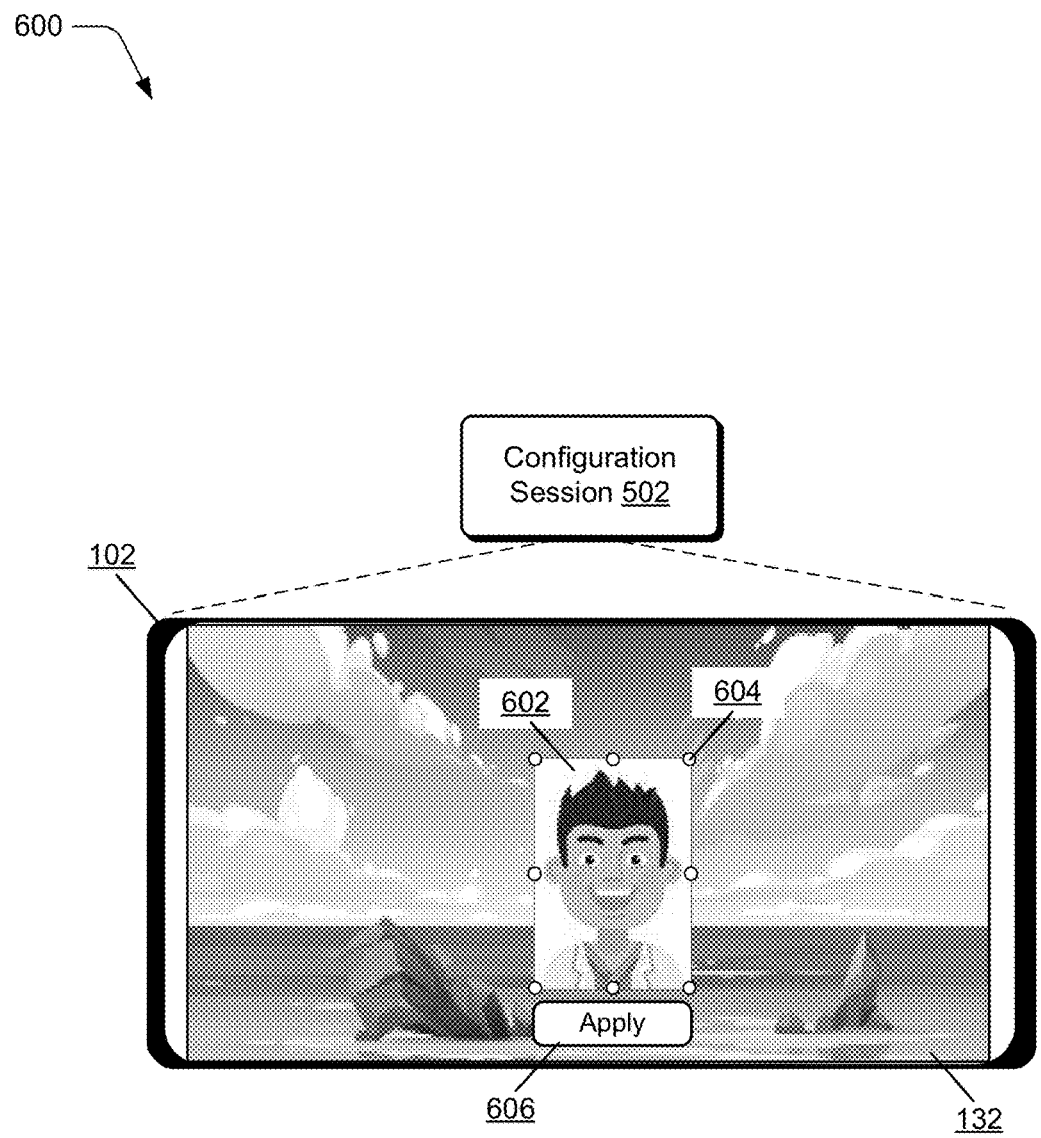
FIG. 6 depicts an example scenario for enabling a user to specify a custom position and/or size for a user image in accordance with one or more implementations.

FIG. 6 depicts an example scenario 600 for enabling a user to specify a custom position and/or size for a user image in accordance with one or more implementations. The scenario 600, for example, is implemented in response to selection of the custom control 510 from the configuration GUI 504 as part of the configuration session 502, introduced above.

In the scenario 600 a user image window 602 is displayed, e.g., via the capture module 122 as part of the configuration session 502. The content capture module 122, for instance, causes the user image window 602 to be displayed as part of the content GUI 132 on the display device 116 of the client device 102. Generally, the user image window 602 is configured to receive user input to reposition and/or resize the user image window 602. For instance, the user image window 602 is selectable to move the user image window 602 to different positions within the content GUI 132. Further, the user image window 602 includes different handles 604 that are selectable to resize the user image window. For example, the handles 604 are configured to receive user input to cause the user interface window 602 to be resized larger and/or smaller, such as vertically and/or horizontally. Thus, via interaction with the user interface window 602 a user can specify a size and position for presenting an image of the user in scenarios where the user image is presented such as part of generating an instance of media content.

Further to the scenario 600 an apply control 606 is presented that is selectable to generate position and size information based on user interaction with the user image window 602 and saved as part of the capture settings 130. For example, in conjunction with repositioning and/or resizing the user image window 602 a user selects the apply control 606. Accordingly, when an image of the user is subsequently presented as part of generating media content, the image of the user is presented according to the position and/or size specified by the user via interaction with the user image window 602.

Figure 7:
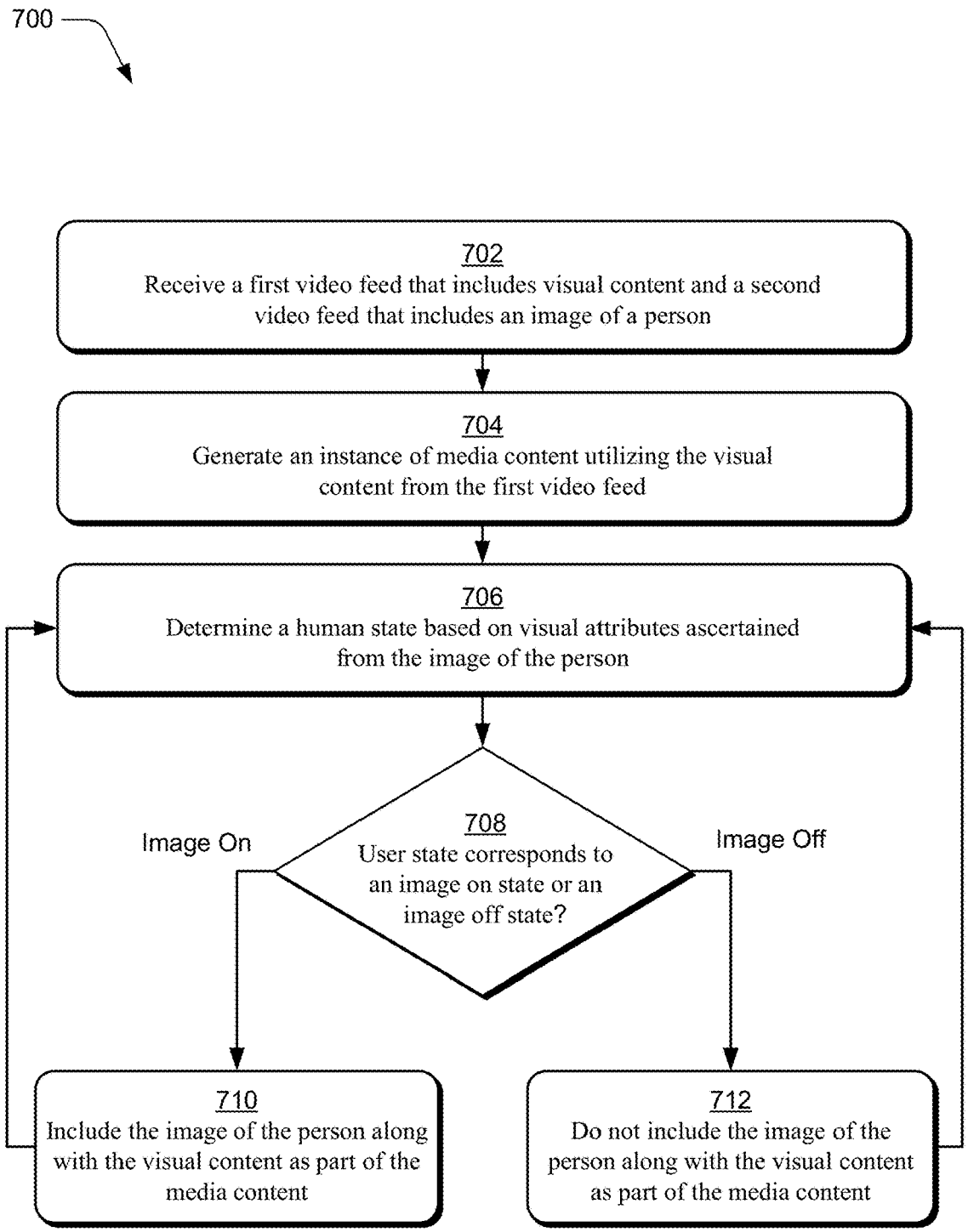
FIG. 7 illustrates an example method for user state for user image in media content in accordance with one or more implementations.

FIG. 7 illustrates an example method 700 for user state for user image in media content in accordance with one or more implementations. At 702 a first video feed that includes visual content and a second video feed that includes an image of a user are received. For instance, with reference to the client device 102, the camera 124a captures an image scene of an environment in proximity to the client device 102 and generates the first video feed. Alternatively or additionally the visual content represents content generated by an application 118. Further, the camera 124b captures an image of a user (e.g., a user in possession of the client device 102) to generate the second video feed.

At 704, an instance of media content utilizing the visual content from the first video feed is generated. The capture module 122, for instance, generates an instance of video content utilizing the visual content captured via the first video feed. At 706 a user state is determined based on visual attributes ascertained from the image of the user. For instance, the visual attributes include detected facial gestures of a user, and the user state is determined based on the facial gestures. In at least one implementation the user state is determined by correlating the facial gestures to state mappings specified by the user states 214. Different examples of user states are discussed above and include image-on states (e.g., an engaged state) and image-off states, e.g., a disengaged state, a body state, a consume state, etc.

At 708 it is determined whether the user state corresponds to an image-on state or an image-off state. Different examples of image-on states and image-off states are described above. If the user state corresponds to an image-on state ("Image On"), at 710 the image of the user is included along with the visual content as part of the media content. The capture module 122, for instance, includes a user image with visual content being generated. If the user state corresponds to an image-off state ("Image Off"), at 712 the image of the user is not included as part of the visual content. The capture module 122, for example, does not include a user image as part of the visual content. Generally, the method is performable in real time to respond automatically and dynamically to changes in user state. For instance, the method returns to 708 to monitor user state and is able to dynamically respond to changes in user state, such as to detect changes in visual attributes of a user that indicate changes between an image-on state and an image-off state.

Figure 8:
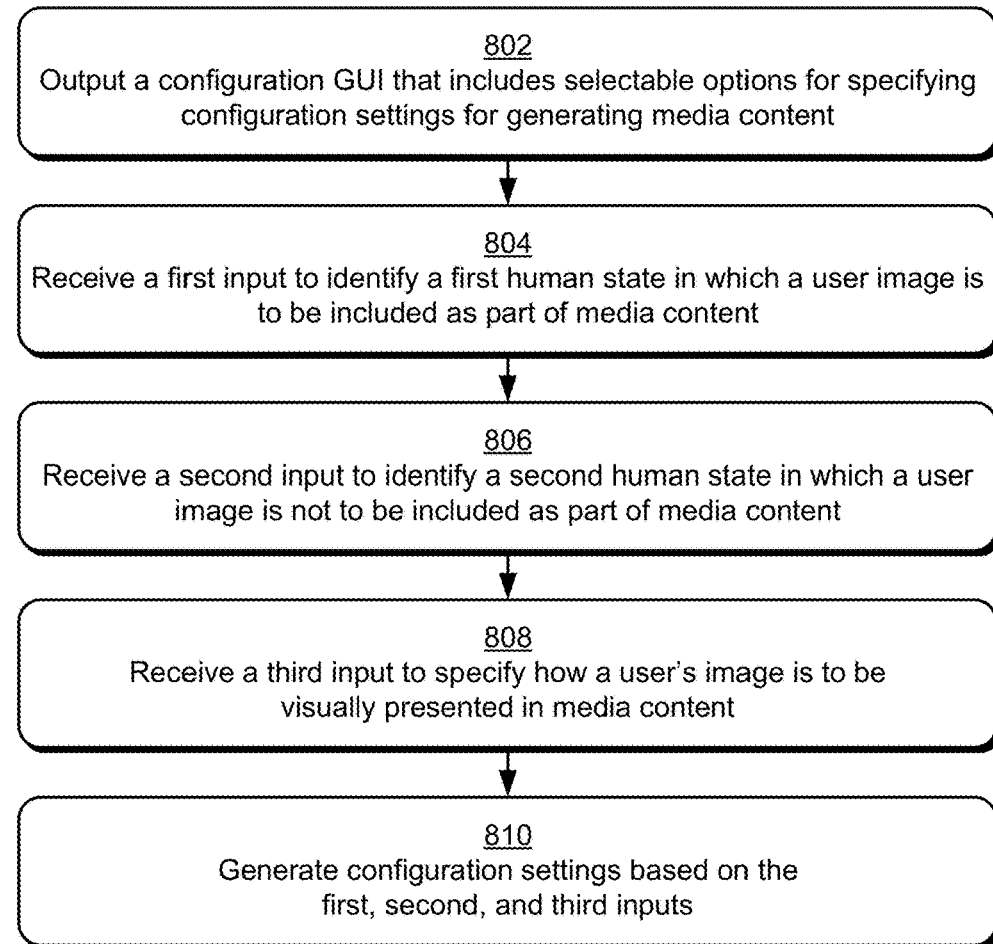
FIG. 8 illustrates an example method for configuring settings for user state for user image in media content in accordance with one or more implementations.

FIG. 8 illustrates an example method 800 for configuring settings for user state for user image in media content in accordance with one or more implementations. The method 800, for instance, represents an example way for implementing the configuration session 502. At 802, a configuration GUI is output that includes selectable options for specifying configuration settings for generating media content. The configuration settings, for instance, include settings for image-on states, image-off states, settings for specifying how a user's image is to be sized and/or positioned in media content, and so forth. The capture module 122, for example, generates the configuration GUI 504 and causes the configuration GUI 504 to be output via the display device 116 of the client device 102.

At 804, a first input is received to identify a first user state in which a user image is to be included as part of media content. The capture module 122, for example receives user input to select a user state in which a user image is to be included in media content, e.g., an image-on state 215a. At 806, a second input is received to identify a second user state in which a user image is not to be included as part of media content. The capture module 122, for example receives user input to select a user state in which a user image is not to be included in media content, e.g., an image-off state 215b.

At 808, a third input is received to specify how a user's image is to be visually presented in media content. The capture module 122, for example receives user input to specify how a user's image is to be sized and/or positioned in media content. At 810, configuration settings are generated based on the first, second, and third inputs. The capture module 122, for example, generates the capture settings 130 and controls media content generation based on the capture settings 130, such as to control in which user states a user image is included or not included in media content, and/or to control how a user image is visually presented in media content.

Accordingly, implementations of user state for user image in media content provide ways for controlling presentation of user images in media content.

The example methods described above may be performed in various ways, such as for implementing different aspects of the systems and scenarios described herein. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. The order in which the methods are described is not intended to be construed as a limitation, and any number or combination of the described method operations can be performed in any order to perform a method, or an alternate method.

Figure 9:
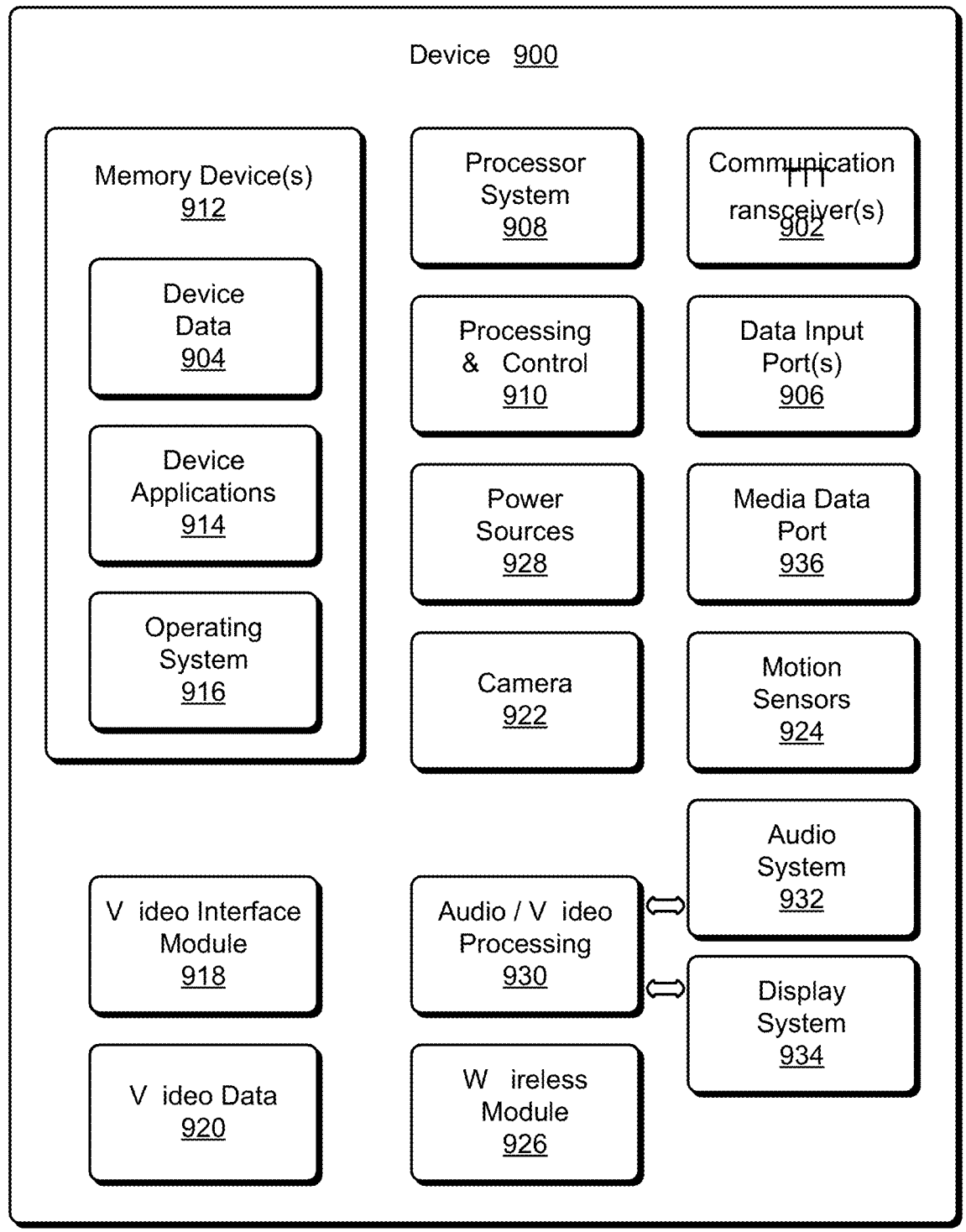
FIG. 9 illustrates various components of an example device in which aspects of user state for user image in media content can be implemented.

FIG. 9 illustrates various components of an example device 900 in which aspects of user state for user image in media content can be implemented. The example device 900 can be implemented as any of the devices described with reference to the previous FIGS. 1-8, such as any type of mobile device, mobile phone, mobile device, wearable device, tablet, computing, communication, entertainment, gaming, media playback, and/or other type of electronic device. For example, the client device 102 as shown and described with reference to FIGS. 1-8 may be implemented as the example device 900.

The device 900 includes communication transceivers 902 that enable wired and/or wireless communication of device data 904 with other devices. The device data 904 can include any of device identifying data, device location data, wireless connectivity data, and wireless protocol data. Additionally, the device data 904 can include any type of audio, video, and/or image data. Example communication transceivers 902 include wireless personal area network (WPAN) radios compliant with various IEEE 902.15 (Bluetooth™) standards, wireless local area network (WLAN) radios compliant with any of the various IEEE 902.11 (Wi-Fi™) standards, wireless wide area network (WWAN) radios for cellular phone communication, wireless metropolitan area network (WMAN) radios compliant with various IEEE 902.16 (WiMAX™) standards, and wired local area network (LAN) Ethernet transceivers for network data communication.

The device 900 may also include one or more data input ports 906 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 900 includes a processing system 908 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 910. The device 900 may further include any type of a system bus or other data and command transfer system that couples the various components within the device. A system bus can include any one or combination of different bus structures and architectures, as well as control and data lines.

The device 900 also includes computer-readable storage memory 912 (e.g., memory devices) that enable data storage, such as data storage devices that can be accessed by a computing device, and that provide persistent storage of data and executable instructions (e.g., software applications, programs, functions, and the like). Examples of the computer-readable storage memory 912 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 900 may also include a mass storage media device.

The computer-readable storage memory 912 provides data storage mechanisms to store the device data 904, other types of information and/or data, and various device applications 914 (e.g., software applications). For example, an operating system 916 can be maintained as software instructions with a memory device and executed by the processing system 908. The device applications may also include a device manager, such as any form of a control application, software application, signal-processing and control module, code that is native to a particular device, a hardware abstraction layer for a particular device, and so on. Computer-readable storage memory 912 represents media and/or devices that enable persistent and/or non-transitory storage of information in contrast to mere signal transmission, carrier waves, or signals per se. Computer-readable storage memory 912 do not include signals per se or transitory signals.

In this example, the device 900 includes a capture module 918 that implements aspects of user state for user image in media content and may be implemented with hardware components and/or in software as one of the device applications 914. In an example, the capture module 918 can be implemented as the capture module 122 described in detail above. In implementations, the capture module 918 may include independent processing, memory, and logic components as a computing and/or electronic device integrated with the device 900. The device 900 also includes capture data 920 for implementing aspects of user state for user image in media content and may include data from and/or utilized by the capture module 918.

In this example, the example device 900 also includes a camera 922 and motion sensors 924, such as may be implemented in an inertial measurement unit (IMU). The motion sensors 924 can be implemented with various sensors, such as a gyroscope, an accelerometer, and/or other types of motion sensors to sense motion of the device. The various motion sensors 924 may also be implemented as components of an inertial measurement unit in the device.

The device 900 also includes a wireless module 926, which is representative of functionality to perform various wireless communication tasks. For instance, for the client device 102, the wireless module 926 can be leveraged to scan for and detect wireless networks, as well as negotiate wireless connectivity to wireless networks for the client device 102. The device 900 can also include one or more power sources 928, such as when the device is implemented as a mobile device. The power sources 928 may include a charging and/or power system, and can be implemented as a flexible strip battery, a rechargeable battery, a charged super-capacitor, and/or any other type of active or passive power source.

The device 900 also includes an audio and/or video processing system 930 that generates audio data for an audio system 932 and/or generates display data for a display system 934. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 936. In implementations, the audio system and/or the display system are integrated components of the example device. Alternatively, the audio system and/or the display system are external, peripheral components to the example device.

Although implementations of user state for user image in media content have been described in language specific to features and/or methods, the subject of the appended claims is not necessarily limited to the specific features or methods described. Rather, the features and methods are disclosed as example implementations of user state for user image in media content, and other equivalent features and methods are intended to be within the scope of the appended claims. Further, various different examples are described, and it is to be appreciated that each described example can be implemented independently or in connection with one or more other described examples. Additional aspects of the techniques, features, and/or methods discussed herein relate to one or more of the following:

In some aspects, the techniques described herein relate to a method including: receiving a first video feed that includes visual content and a second video feed that includes an image of a user; generating an instance of media content utilizing the visual content from the first video feed; determining a user state based on visual attributes ascertained from the image of the user in the second video feed; and determining, based on the user state, whether to include the image of the user along with the visual content in the media content.

In some aspects, the techniques described herein relate to a method, wherein the first video feed is captured via a first camera and the visual content represents a scene of an environment in proximity to the first camera, and the second video feed is captured via a second camera and the image of the user includes a live image of the user captured via the second video feed.

In some aspects, the techniques described herein relate to a method, wherein the visual content from the first video feed includes application content captured from one or more of an application executed on a device or an application exposed by the device.

In some aspects, the techniques described herein relate to a method, further including detecting the visual attributes including identifying one or more facial gestures of the user, and wherein the determining the user state includes comparing the one or more facial gestures to state mappings that specify facial gestures for different user states to determine from the state mappings that the one or more facial gestures correlate to the user state.

In some aspects, the techniques described herein relate to a method, wherein the determining the user state includes determining that the user is in a disengaged state, and wherein the determining whether to include the image of the user includes determining not to include the image of the user along with the visual content in the media content.

In some aspects, the techniques described herein relate to a method, wherein the determining the user state includes determining that the user is in an engaged state, and wherein the determining whether to include the image of the user includes determining to include the image of the user along with the visual content in the media content.

In some aspects, the techniques described herein relate to a method, wherein the determining the user state includes determining that the user is in one or more of a body state or a consuming state, and wherein the determining whether to include the image of the user includes determining not to include the image of the user along with the visual content in the media content.

In some aspects, the techniques described herein relate to a method, wherein the determining the user state includes determining that the user is in an engaged state, and wherein the determining whether to include the image of the user includes determining to include the image of the user along with the visual content in the media content, the method further including: determining based on further visual attributes ascertained from the image of the user that the user transitions from the engaged state to a disengaged state; and determining to at least temporarily stop inclusion of the image of the user in the media content.

In some aspects, the techniques described herein relate to a method, wherein: the determining that the user is in an engaged state is based on determining that the visual attributes ascertained from the image of the user indicate that the user is talking; and the determining that the user transitions from the engaged state to a disengaged state is based on determining that the further visual attributes ascertained from the image of the user indicate that the user stops talking.

In some aspects, the techniques described herein relate to a method, further including: receiving first input to identify a first user state in which a user image is to be included as part of media content; receiving second input to identify a second user state in which a user image is not to be included as part of media content; and generating configuration settings for generating media content based on the first input and the second input.

In some aspects, the techniques described herein relate to a method, including: receiving a first video feed that includes visual content and a second video feed that includes an image of a user, and generating an instance of media content utilizing the visual content from the first video feed; determining based on first visual attributes ascertained from the image of the user that the user is in a disengaged state such that the image of the user is not included in the media content; determining, based on second visual attributes ascertained from the image of the user, that the user transitions to an engaged state; and including, based on detecting the transition to the engaged state, the image of the user along with the visual content in the media content.

In some aspects, the techniques described herein relate to a method, wherein the first video feed is captured via a first camera and the visual content represents a scene of an environment in proximity to the first camera, and the second video feed is captured via a second camera and the image of the user includes a live image captured via the second video feed.

In some aspects, the techniques described herein relate to a method, wherein the visual content of the first video feed is captured via an application that is one or more of executed by a device or exposed by the device, and the image of the user of the second video feed is captured via one or more cameras of the device.

In some aspects, the techniques described herein relate to a method, wherein the first visual attributes ascertained from the image of the user indicating that the user is in a disengaged state include an indication that the user is not talking, and the second visual attributes ascertained from the image of the user indicating that the user transitions to an engaged state include an indication that the user is one or more of talking or about to talk.

In some aspects, the techniques described herein relate to a method, wherein the determining, based on the second visual attributes ascertained from the image of the user, that the user transitions to an engaged state includes identifying one or more facial gestures of the user, and comparing the one or more facial gestures to state mappings that specify facial gestures for different user states to determine from the state mappings that the one or more facial gestures indicate that the user transitions to the engaged state.

In some aspects, the techniques described herein relate to a method, further including: determining, based on third visual attributes ascertained from the image of the user, that the user transitions from an image-on state to an image-off state; and determining to at least temporarily stop inclusion of the image of the user in the media content.

In some aspects, the techniques described herein relate to a system including: one or more processors implemented at least partially in hardware; and one or more computer-readable storage media storing instructions that are executable by the one or more processors to: receive a first video feed that includes visual content and a second video feed that includes an image of a user, and generate an instance of media content utilizing the visual content from the first video feed and the image of the user from the second video feed; determine based on first visual attributes ascertained from the image of the user that the user transitions to an image-off state such that inclusion of the image of the user in the media content is at least temporarily stopped; and determine, based on second visual attributes ascertained from the image of the user, that the user transitions to an image-on state such that inclusion of the image of the user is resumed.

In some aspects, the techniques described herein relate to a system, wherein the first visual attributes include one or more of an indication of one or more of that that the user is in a body state or a consume state.

In some aspects, the techniques described herein relate to a system, wherein the first visual attributes include an indication that the user is in a disengaged state, and the image-on state includes an indication that the user is in an engaged state.

In some aspects, the techniques described herein relate to a system, wherein the instructions are executable by the one or more processors to present a graphical user interface with selectable options for selecting one or more of the image-off state or the image-on state.

The invention claimed is:

1. A method comprising:
   receiving a first video feed that includes visual content and a second video feed that includes an image of a user;
   generating an instance of media content utilizing the visual content from the first video feed;
   determining a user state based on visual attributes ascertained from the image of the user in the second video feed; and determining, based on the user state, whether to include the image of the user along with the visual content in the media content, further comprising:
including, based at least in part on the user state corresponding to an image on state, the image of the user along with the visual content such that the visual content from the first video feed and the image of the user from the second video feed are displayed together;
determining that the user state transitions to an image off state; and
removing, based at least in part on the transition to the image off state, the image of the user from display along with the visual content and while maintaining display of the visual content.

2. The method as recited in claim 1, wherein the first video feed is captured via a first camera and the visual content represents a scene of an environment in proximity to the first camera, and the second video feed is captured via a second camera and the image of the user comprises a live image of the user captured via the second video feed.

3. The method as recited in claim 1, wherein the visual content from the first video feed comprises application content captured from one or more of an application executed on a device or an application exposed by the device.

4. The method as recited in claim 1, further comprising detecting the visual attributes including identifying one or more facial gestures of the user, and wherein said determining the user state comprises comparing the one or more facial gestures to state mappings that specify facial gestures for different user states to determine from the state mappings that the one or more facial gestures correlate to the user state.

5. The method as recited in claim 1, wherein said determining the user state comprises determining that the user is in a disengaged state, and wherein said determining whether to include the image of the user comprises determining not to include the image of the user along with the visual content in the media content.

6. The method as recited in claim 1, wherein said determining the user state comprises determining that the user is in an engaged state, and wherein said determining whether to include the image of the user comprises determining to include the image of the user along with the visual content in the media content.

7. The method as recited in claim 1, wherein said determining the user state comprises determining that the user is in one or more of a body state or a consuming state, and wherein said determining whether to include the image of the user comprises determining not to include the image of the user along with the visual content in the media content.

8. The method as recited in claim 1, wherein said determining the user state comprises determining that the user is in an engaged state, and wherein said determining whether to include the image of the user comprises determining to include the image of the user along with the visual content in the media content, the method further comprising:
determining based on further visual attributes ascertained from the image of the user that the user transitions from the engaged state to a disengaged state; and
determining to at least temporarily stop inclusion of the image of the user in the media content.

9. The method as recited in claim 8, wherein:
said determining that the user is in an engaged state is based on determining that the visual attributes ascertained from the image of the user indicate that the user is talking; and said determining that the user transitions from the engaged state to a disengaged state is based on determining that the further visual attributes ascertained from the image of the user indicate that the user stops talking.

10. The method as recited in claim 1, further comprising:
receiving first input to identify a first user state in which a user image is to be included as part of media content;
receiving second input to identify a second user state in which a user image is not to be included as part of media content; and
generating configuration settings for generating media content based on the first input and the second input.

11. A method, comprising:
receiving a first video feed that includes visual content and a second video feed that includes an image of a user, and generating an instance of media content utilizing the visual content from the first video feed;
determining based on first visual attributes ascertained from the image of the user that the user is in a disengaged state such that the image of the user is not included in the media content;
determining, based on second visual attributes ascertained from the image of the user, that the user transitions to an engaged state; and
including, based on detecting the transition to the engaged state, the image of the user along with the visual content in the media content.

12. The method as recited in claim 11, wherein the first video feed is captured via a first camera and the visual content represents a scene of an environment in proximity to the first camera, and the second video feed is captured via a second camera and the image of the user comprises a live image captured via the second video feed.

13. The method as recited in claim 11, wherein the visual content of the first video feed is captured via an application that is one or more of executed by a device or exposed by the device, and the image of the user of the second video feed is captured via one or more cameras of the device.

14. The method as recited in claim 11, wherein the first visual attributes ascertained from the image of the user indicating that the user is in a disengaged state comprise an indication that the user is not talking, and the second visual attributes ascertained from the image of the user indicating that the user transitions to an engaged state comprise an indication that the user is one or more of talking or about to talk.

15. The method as recited in claim 11, wherein said determining, based on the second visual attributes ascertained from the image of the user, that the user transitions to an engaged state comprises identifying one or more facial gestures of the user, and comparing the one or more facial gestures to state mappings that specify facial gestures for different user states to determine from the state mappings that the one or more facial gestures indicate that the user transitions to the engaged state.

16. The method as recited in claim 11, further comprising:
determining, based on third visual attributes ascertained from the image of the user, that the user transitions from an image-on state to an image-off state; and
determining to at least temporarily stop inclusion of the image of the user in the media content.

17. A system comprising:
one or more processors implemented at least partially in hardware; and one or more computer-readable storage media storing instructions that are executable by the one or more processors to:
- receive a first video feed that includes visual content and a second video feed that includes an image of a user, and generate an instance of media content utilizing the visual content from the first video feed and the image of the user from the second video feed;
- determine based on first visual attributes ascertained from the image of the user that the user transitions to an image-off state such that inclusion of the image of the user in the media content is at least temporarily stopped; and
- determine, based on second visual attributes ascertained from the image of the user, that the user transitions to an image-on state such that inclusion of the image of the user in the media content is resumed.

18. The system of claim 17, wherein the first visual attributes comprise one or more of an indication of one or more of that the user is in a body state or a consume state.

19. The system of claim 17, wherein the first visual attributes comprise an indication that the user is in a disengaged state, and the image-on state comprises an indication that the user is in an engaged state.

20. The system of claim 17, wherein the instructions are executable by the one or more processors to present a graphical user interface with selectable options for selecting one or more of the image-off state or the image-on state.

* * * * *